Figure 1:
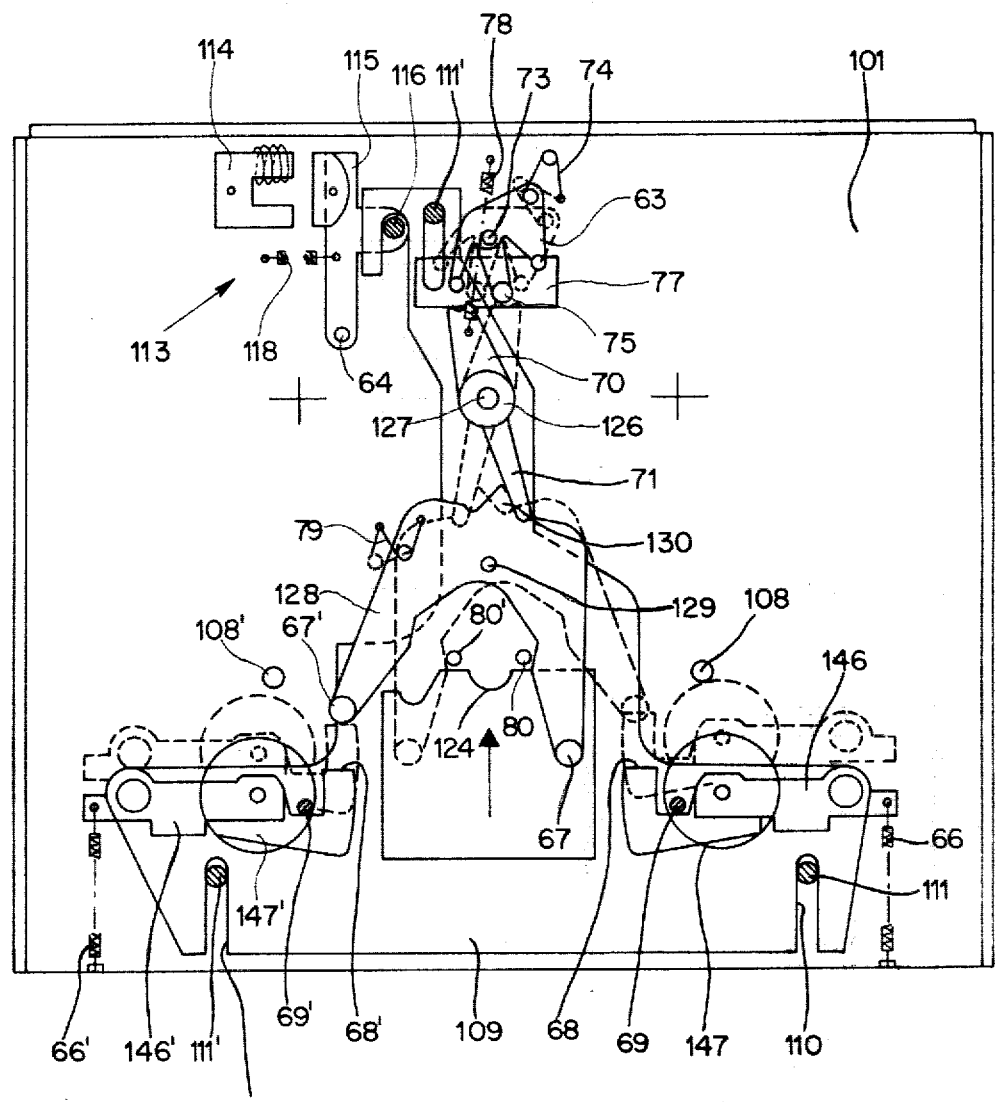

United States Patent [19]
Pera

[11] 4,283,746
[45] Aug. 11, 1981

[54] ACTUATING DEVICE FOR THE ADVANCEMENT OF THE TAPE IN A CASSETTE-TYPE TAPE RECORDING/PLAYBACK APPARATUS

[75] Inventor: Vittorio Pera, Rome, Italy

[73] Assignee: Autovox S.p.A., Rome, Italy

[21] Appl. No.: 113,424

[22] Filed: Jan. 18, 1980

[30] Foreign Application Priority Data

Jan. 18, 1979 [IT] Italy .............................. 47691 A/79

[51] Int. Cl.³ ...................... G11B 15/26; G11B 15/44; G11B 19/26
[52] U.S. Cl. .................................... 360/96.4; 242/199
[58] Field of Search .................. 360/96.4, 96.1–96.3, 360/93, 90, 96.5–96.6; 242/197–202

[56] References Cited

U.S. PATENT DOCUMENTS

| | | | |
|---|---|---|---|
| 3,767,137 | 10/1973 | Richt et al. | 360/96.4 |
| 3,781,019 | 12/1973 | Kikuchi et al. | 360/96.2 |
| 4,010,493 | 3/1977 | Cicatelli | 360/96.4 |
| 4,014,041 | 3/1977 | Cicatelli | 360/96.4 |
| 4,101,941 | 7/1978 | Tanaka | 360/96.4 |

Primary Examiner—Alfred H. Eddleman
Attorney, Agent, or Firm—Ladas & Parry

[57] ABSTRACT

An actuating device for the advancement of the tape in a cassett-type tape recording and playing apparatus of the type in which reading of the tape by the magnetic recording/playing head takes place during tape feed in one direction or the other. The main elements which form the device are a slider, supports for pressure rollers, a guide, a rocking arm, a latch, and a bistable element which controls selection of transmission of motion to the hub carrying disks.

7 Claims, 2 Drawing Figures

ACTUATING DEVICE FOR THE ADVANCEMENT OF THE TAPE IN A CASSETTE-TYPE TAPE RECORDING/PLAYBACK APPARATUS

This invention refers to an actuating device for the advancement of the tape in a cassette-type tape recording and playing apparatus of the type in which reading of the tape by the magnetic recording/playing head takes place during tape feed in one direction or the other.

In my copending patent application Ser. No. 051,098 of June 22, 1979, assigned to the present Assignee, a device comprising a frame, two flywheels rotating in opposite directions driven by a motor actuated belt drive, two capstans each integral and coaxial with the flywheel, a pressing roller for each capstan, two driving plates, each driven by a wheel and clutch pivoted around a pin fastened to the frame, was described in which a device for controlling the tape feed is characterised in that a guiding element fastened to the frame apt to assume a first or second set position under the action of a rocking arm element and apt to guide said rocking arm element towards a first or second control position which depends on said first or second set position of said guiding element so as to control feeding of the magnetic tape in one direction or the other.

In the cited patent application an embodiment of the invention is also described in which as the slider travels in direction of the operative position presetting of the apparatus for activating the magnetic tape feed in one direction takes place and at the same time presetting of the guide in its set position, which in a successive control cycle prepares for inversion of the magnetic tape feed direction, takes place as well.

This invention is a similar embodiment of an analogous device which presents a lower passive resistance of the various members during travelling of the slider towards the operative position. This allows greater operating reliability in relation to power of the motor, or offers the possibility of using a lower power rating motor in order to operate.

In particular change of the set position of the guide in accordance with this invention does not take place during the feeding travel of the slider towards the operative position any longer, but takes place during the return travel of the slider towards its idle position instead, therefore the set position change relies on the strength of the return springs instead of on the direct action of the motor.

This invention also describes a system for controlling the transmission of motion to the desired driving plate which is different with respect to the system described in the cited patent application.

It is therefore an objective of this invention to provide a tape feeding control device requiring less power from the motor of the apparatus in order to achieve travelling of the slider towards the operative position.

Another objective of this invention is to obtain selection of the transmission of motion to the hub carrying disks through indirect action of the rocking arm which acts on a bistable element which selects transmission of motion to the desired disk instead of through a direct action of the rocking arm.

In accordance with the invention, the device comprises: a slider bound to the frame in substantially the same manner described in the cited patent application; unidirectional motion transmitting means transmitting motion from a flywheel to the slider when the latter is in its idle position, these means being also substantially the same as those described in the cited copending patent application; a latch for blocking the slider in its operative position and an unlatching element which releases the slider so that it may return to its idle position, these means being substantially the same as those described in the cited copending patent application also; an oscillating guide apt to perform an angular movement between two set positions around a pivot which is integral with the frame, said guide being provided with two abutments selectively engageable with one of the two pressure rollers supports, depending on its set position and said guide being further provided with a profile for guiding the rocking arm; a rocking arm oscillating between two positions around a pivot fixed to the slider and having an elongation which during translation of the slider towards the operative position, is apt to be guided by said profile in the guide in order to maintain one of its two positions, and during translation of the slider towards its idle position pushes said guide towards the other set position, while the rocking arm itself takes up the other of its two positions due to the engagement with the profile of said guide; two pressure roller supports connected to rotate with said slider substantially as described in the cited patent application, said supports having one end shaped to rest on one of the stopping abutments of the guide; a bistable element which may rotate around a pivot integral with the frame, and controlled by said rocking arm during travel of the slider towards its operative position so as to move from one stable position to the other, said bistable element being apt to control, in its movement, rotation of one driving plate or the other so that, in the same manner as described in the cited patent application, a translating movement of the slider from its operative position to its idle position and vice versa, changes the direction of feed and reading of the magnetic tape.

Figure 2:
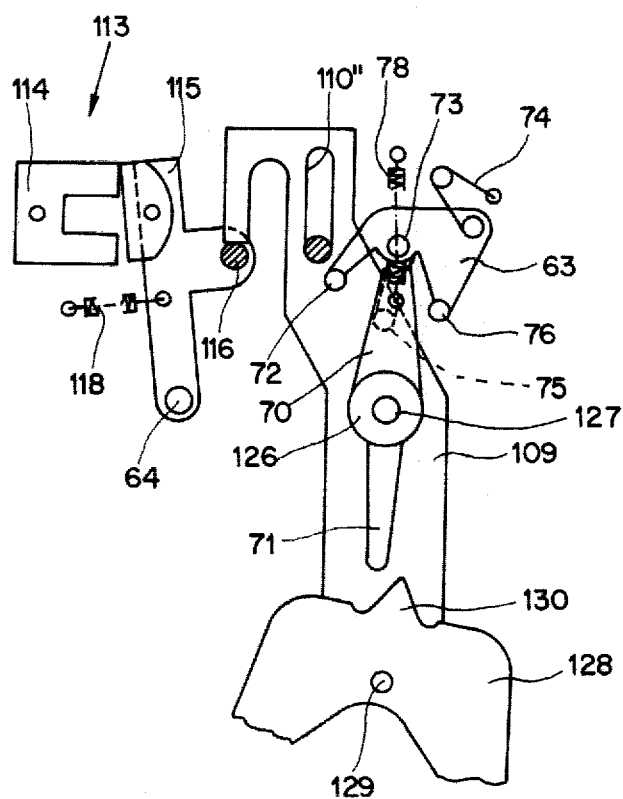

The invention will be described by way of a non limiting example in greater detail with reference to the enclosed drawings in which:

FIG. 1 shows the device according to the invention, in its whole and with the slider in its idle position; and FIG. 2 shows the details of a part of the device with the slider in its operative position.

In the figures, parts which correspond in the cited patent application as well, are identified with the same reference numerals used in the cited patent application with the addition of the numerals 100.

The main elements which from the device according to the invention are the following: a slider 109, supports 146, 146' for pressure rollers 147, 147', a guide 128, a rocking arm 126, a latch 113 and a bistable element 63 which controls selection of transmission of motion to the hub carrying disks.

As in the device illustrated in the cited patent application, the motor (not shown) of the magnetic tape recording/playing apparatus is coupled by means of a transmission made through counter rotating flywheels (not shown).

A sprocket is integral with one of the flywheels, said sprocket being apt to be engaged with a gear having a section without teeth, a cam is integral with said gear which, as said gear rotates, pushes slider 109 from its idle position shown in FIG. 1 towards its operative position shown in partial view in FIG. 2. All this is similar to what has been described in the cited patent application. Slider 109 is bound to a translation movement along the center line axis of the device, as described in the cited patent application by means of slots 110, 110' and 110" and pivots 111, 111', 111''' integral with frame 101. In the embodiment according to the invention, blocking latch 113 of slider 109 in its operative position is formed by an electromagnet 114 and a keeper 115 which rotates around a pivot 64 integral with the frame and biased by a spring 118 towards its position away. electromagnet 114. When the slider reaches its operative position (FIG. 2) an operative voltage applied to electromagnet 114 attracts keeper 115 overcoming the action of spring 118 and an abutment 116 integral with the keeper is positioned beneath an abutment 65 of slider 109 thus preventing said slider 109 from returning to its idle position as long as voltage is applied to the electromagnet 114.

When it is desired to invert direction of the magnetic tape in order to invert its reading, electromagnet 114 is de-energized so that spring 118 recalls keeper 115 towards its position shown in FIG. 1 and slider 109 is sent back to its idle position by springs 66, 66' placed between frame 101 and one end of supports 146, 146' of pressure rollers, bringing the above mentioned gear of the cam in engagement with the said sprocket integral with one of the flywheels, in order to repeat the translation operation of slider 109 from its idle position to its operative position by means of the cam dragging over a profile 124 of slider 109. According to this invention, as previously stated, translation of the slider from its idle position to its operative position enables the device to perform the operation of inverting the direction of movement of the tape, while the travel of the slider from its operative position to its idle position enables the device to determine the setting of guide 128 in preparation of change in direction of movement of the tape.

To this end guide 128 which, as in the cited patent application, is pivoted on the frame by means of a pivot 129, and may take up two extreme set positions.

Guide 128 has a profile 130 for the guiding rocking arm and two abutments 67, 67' which have the function of preventing engagement between a pressure roller 147 or 147' with its related capstan 108, 108' in order to select the direction of forward movement of the tape in front of the magnetic head, as already described in the cited patent application.

In FIG. 1 the set position of guide 128 is such that abutment 67' engages an abutment 68' of pressure roller support 146' (shown in broken lines), while abutment 67 of guide 128 is not in contact with abutment 68 of pressure roller support 146, therefore pressure roller 147 (shown in broken lines) is in contact with capstan 108 in order to allow forward movement of the tape in engagement between said capstan 108 and pressure roller 147. In the other set position of guide 128, shown in broken lines, engagement between the capstans and the pressure rollers is inverted thereby determining an inversion of the direction of movement of the tape.

As shown in FIG. 1, pressure of the pressing rollers against the capstan is produced by the same springs 66, 66' which have the function of providing return of the slider towards its idle position and two abutments 69, 69' serving as stops for supports 146, 146'. The particular set position of guide 128 is established by rocking arm 126 during return of the slider to its idle position.

Rocking arm 126, as described in the cited patent application, oscillates on a pivot 127 integral with slider 109 and has two elongations respectively identified as 70 and 71. Elongation 71 is engaged with profile 130 in guide 128 and elongation 70 instead has the function of engaging and controlling bistable element 63. Therefore in the position of the various elements shown in FIG. 1, when slider 109, starting from the idle position shown, begins to translate towards the operative position, it carries rocking arm 126 guided initially by profile 130 towards engagement with an arm 72 of bistable element 63. Said bistable element 63 rotates around a pivot 73 integral with the frame under the pushing action of elongation 70 and with the aid of a bistable spring 74 moves to its other stable position shown in broken lines in FIG. 1 and in full lines in FIG. 2. During the movement of bistable element 63, an appendix 75 thereof, which is in a displaced plane with respect to said arm 72, and the other arm 76 of bistable element 63, acts on a mechanism, schematically indicated with 77 which controls rotation, through the motor, of the desired hub carrying disk in accordance with the direction of travel of the tape determined by the set position of guide 128. After moving bistable element 63, rocking arm 126, which in the meantime has disengaged from elongation 71 and profile 130, is moved by means of spring 78 to a neutral position as shown in FIG. 2.

The device stays in this position while the recording/playing apparatus is operating with the tape moving in a certain direction.

When it is desired to invert the direction of the tape, latch 113 releases slider 109, which returns towards its idle position under the action of spring 66, 66'. During this travel elongation 71 of rocking arm 126 comes into contact with the other side of profile 130 of guide 128 and forces said guide to rotate around its pivot 129 towards its other set position with the aid of bistable spring 79. The guide therefore takes up the position indicated in broken lines in FIG. 1 and at the same time profile 130 forces rocking arm 126 to assume the position again indicated in FIG. 1 in broken lines, in which position elongation 70 is ready to engage with the other arm 76 of bistable element 63.

When the slider translates back to the operative position, rocking arm 126 acts upon arm 76 moving bistable element 63 back to the position indicated in broken lines in FIG. 1, while guide 128 in its new set position will have reversed the engagement between capstan and pressure rollers with respect to the previously illustrated case, thus inverting the reading direction of the tape.

Operation of the device described herein, is based on the assumption that the various elements forming the device itself are positioned on a different plane.

As an example of embodiment, with reference to the plane formed by frame 101, a plane may be defined beneath the frame in which the capstans, the pressure roller supports and pressure rollers themselves, plus return springs 66, 66' and rocking arm spring 78 are situated. In a plane above the frame are guide 128, rocking arm 126 and arms 72 and 76 of bistable element 63.

In a higher plane are slider 109 and the cam which acts upon profile 124. Appendix 75 of bistable element 63 and the mechanism controlling the disks are in a still higher plane.

Furthermore two abutments 80, 80' are provided on the frame in order to establish the extreme set positions of guide 128.

Though the invention has been described in considerable detail for reasons of clarity, it is intended that it may undergo variations and modifications without departing from the field of the invention itself.

What is claimed is:

1. An actuating device for the advancement of the tape in a cassette-type recording/playback apparatus having a frame, two counterrotating flywheels driven through a belt transmission actuated by a motor, two capstans each of which is integral and coaxial with one of the flywheels, a pressure roller for each capstan, two hub carrying disks made to rotate around a pin attached to the frame, and a center line axis being defined, on said frame plane, which is equidistant from the axis of rotation of the two flywheels and equidistant from the axis of rotation of the hub carrying disks, comprising: a slider bound to the frame so as to translate parallelly with respect to the center line axis in order to assume an operative position and an idle position and biased by return springs towards the idle position; unidirectional motion transmitting means which transmit the motion of one fly wheel to the slider when the latter is in its idle position, and carry out the translation thereof towards its operating position, against the action of said return springs; an oscillating guide apt to perform an angular displacement between two set positions around a pivot which is integral with the frame, placed on the center line axis, said guide having two abutments thereon, each engageable with one of the pressure roller supports, depending on its set position, said guide being also provided with a guiding profile; a rocking arm which oscillates between two positions around a pivot fixed to said slider and having an elongation which, during travel of the slider towards its operative position, is apt to be guided by said guiding profile on the guide and that during translation of the slider towards its idle position is apt to push said guide towards its other set position and to assume the other of its two positions to engage with said guiding profile on the guide; a bistable element which rotates around a pivot which is integral with the frame, controlled by said rocking arm during travel of the slider towards its operative position, in order to move from one of its stable positions to the other, said bistable element being apt to control rotation of one or the other of said hub carrying discs depending on either one or the other of its two positions; two pressure roller supports connected with said slider to rotate, each of said rollers rotatably supporting a pressure roller and biased resiliently towards their corresponding capstans, said supports being provided with an end shaped to comprise a support abutment for one of the stopping abutments on the guide so as to prevent, depending on the set position taken up by the guide, engagement of the pressure roller held by its corresponding support, with its related capstan so that with the guide in a first of its two set positions, translation of the slider towards the operative position carries a pressure roller into engagement with its corresponding capstan and maintains the other pressure roller disengaged from the capstan, so as to transfer and wind the tape in one of the two travelling directions, while returning of the slider to its idle position causes the guide to assume its other position, so that a further translation of the slider towards the operative position determines travel and winding of the magnetic tape in the opposite travel direction.

2. The device according to claim 1 wherein said unidirectional motion transmitting means comprise a gear which rotates around a pivot which is fixed with respect to the frame positioned on said centerline axis, a cam integral with and coaxial to said gear, a sprocket integral with an coaxial to one of the fly wheels in engagement with said gear, so that rotation of the fly wheel is transmitted to said cam, said cam coming into contact, in its rotation, with said slider in order to carry out its translation starting from its idle position and moving towards its operative position, said gear having a section of its perimeter in which no teeth are present so as to interrupt engagement with the sprocket when the slider is in the operative position, said gear being provided with an abutment integral with it and engageable with the slider in its return travel towards its idle position, in order to bring the teeth of the gear back into engagement with the teeth on the sprocket.

3. The device according to claim 1 or 2 wherein said guide is also biased by a bistable spring towards one or the other set positions, its positions being limited by abutments which are fixed to the frame.

4. The device according to claim 1 or 2 wherein said slider is bound, in translation, to the frame in three places by means of a slot and pin coupling.

5. The device according to claim 1 or 2 wherein the latch is formed by a blocking element controlled by a holding electromagnet.

6. The device according to claim 1 or 2 wherein said rocking arm is provided with a further elongation which controls said bistable element, this elongation being in opposition with respect to said first elongation and being biased by a spring towards an intermediate position between its two positions.

7. The device according to claim 1 or 2 wherein the springs recalling the slider towards its idle position are fastened between the frame and one end of the pressure rollers supports.

* * * * *